March 20, 1928. 1,663,483
E. F. PIERCE
INDICATING MEANS
Filed Sept. 12, 1924  2 Sheets-Sheet 1
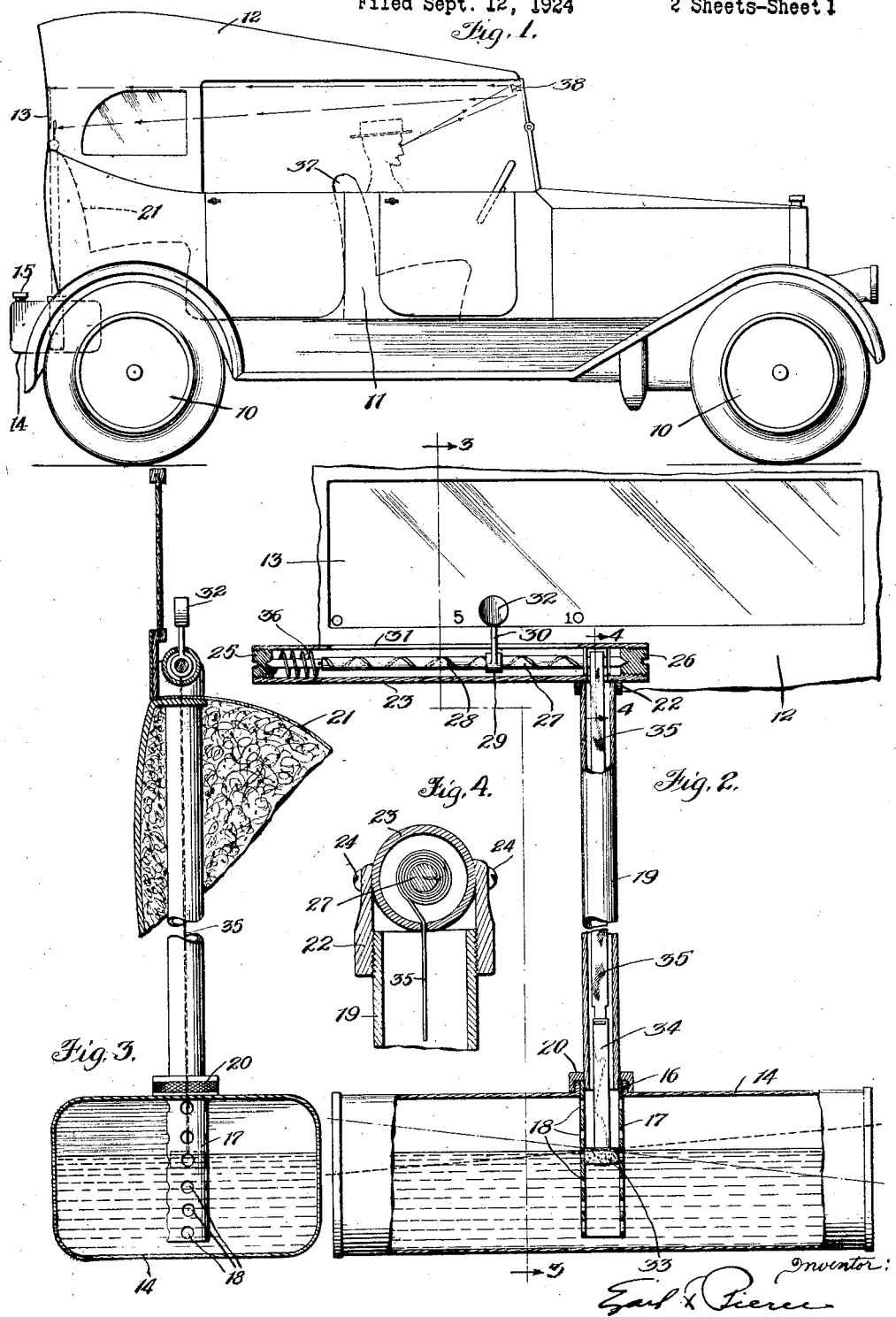

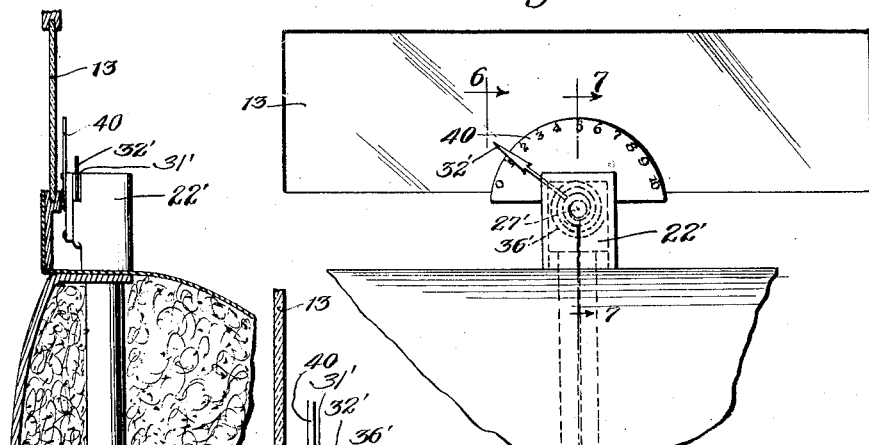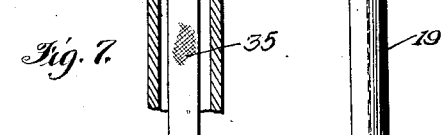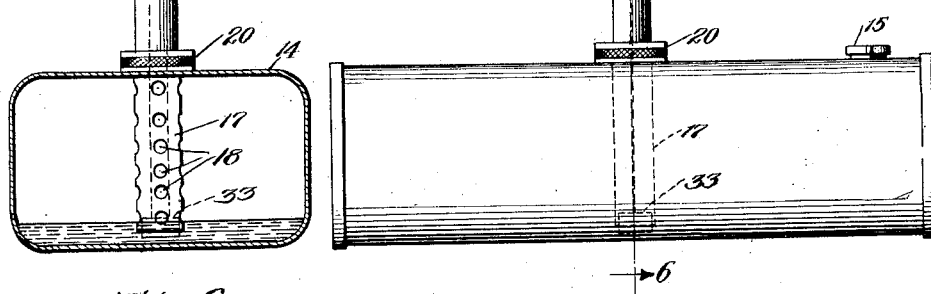

Patented Mar. 20, 1928.

1,663,483

UNITED STATES PATENT OFFICE.

EARL F. PIERCE, OF CHICAGO, ILLINOIS; CENTRAL TRUST COMPANY OF ILLINOIS, ADMINISTRATOR OF SAID EARL F. PIERCE, DECEASED, ASSIGNOR TO FLORENCE E. PIERCE.

INDICATING MEANS.

Application filed September 12, 1924. Serial No. 737,294.

My invention relates to improvements in indicating means, and is particularly concerned with the provision of a novel type of indicating means for indicating to the driver of an automotive vehicle, the quantity of fuel in the fuel tank.

The objects of my present invention are:—

First: To provide a novel indicating means, for the purpose described, in which there is the minimum amount of resistance between the moving parts of the mechanism, and other relatively stationary parts.

Second: To provide a novel indicating means in which the connecting means between the level actuated means in the fuel tank and the indicating means is of the simplest character.

Third: To provide an indicating means such as described in which the mechaical connection between the level actuated means in the fuel tank and the indicating means is as short as possible.

Fourth: To provide an indicating means in which optical means are employed for transmitting the indication over the greater portion of the distance from the fuel tank to the driver.

Fifth: To provide an indicating means located to the rear of the driver's seat; and simple means for enabling the driver to see the indicator of the indicating means, and Sixth: To provide an indicating means such as described that is simple in construction, economical to manufacture, and rugged.

Other objects of my invention will appear as this description progresses, reference being had to the accompanying drawings, in which Figure 1, is a side elevation of an automotive vehicle embodying my invention.

Figure 2 is a vertical transverse section, through a portion of the fuel tank, and the indicating means.

Figure 3, is a vertical section taken on line 3—3 of Fig. 2.

Figure 4, is a section on an enlarged scale, taken on line 4—4 of Fig. 2.

Figure 5, is a rear end elevation of an automotive vehicle embodying a modified form of my invention; parts being broken away for the sake of better illustration.

Figure 6, is a vertical transverse section taken on line 6—6 of Figure 5, and

Figure 7, is a transverse vertical section on an enlarged scale taken on line 7—7 of Figure 5.

Throughout the several views, similar reference characters are used for similar parts, and the several sections are taken looking in the direction of the small arrows.

Referring to the drawings, and for the time being to Figures 1 to 4 inclusive, I have shown my invention as embodied in an automotive vehicle, comprising the wheels 10, body 11, and top 12, having the rear window 13. A fuel tank 14 is supported adjacent the rear end of the body 11, and is provided with the usual filling opening, closed by the cap 15.

Carried by the tubular boss 16, and extending down into the tank 14, is a cylindrical guide and baffle 17, having a plurality of transverse openings 18. A tube 19 has its lower end threaded into the upper end of the guide 17, and an annular cap 20 seals the joint between the guide 17, and the tubular boss 16.

The tube 19 extends substantially vertically upwardly through the rear portion of the body 11, and the back of the rear seat 21, and terminates adjacent the upper side of the rear seat. A sleeve like cap 22 is threaded onto the upper end of the tube 19 and carries the horizontally extending guide tube 23. Screws 24 secure the guide tube in the bifurcations 22' of the cap 22.

Plugs 25 and 26, are threaded into the opposite ends of the tube 23, and act as bearings for the tapered ends of the shaft 27. This shaft has a spiral groove 28 formed therein for receiving a corresponding thread formed in the nut 29 that slides on the shaft 27.

The nut 29 has a stem 30 that extends through the slot 31 formed in the upper side of the tube 23, and carries at its upper end, a target, or indicator 32. This indicator is silhouetted against the rear window 13, and may, simply by its position relative to the end of the rear window, indicate to the driver the quantity of fuel in the tank 14, or a suitable scale may be inscribed on the rear window; or the tube 23 may support a scale for co-acting with the indicator 32.

A float 33, of cork, or other suitable material, is loosely carried in the cylindrical guide 17, and carries a stem 34 that is somewhat longer than the depth of the tank 14. A flexible ribbon 35, of metal, fabric, or other suitable material is connected with the upper end of the stem 34. and extends upwardly through the tube 19. The upper end of the ribbon 35 is connected to the shaft 27.

A helical spring 36 surrounds the opposite end of the shaft 27. One end of this spring is connected with the plug 25, and its other end is anchored to the shaft 27.

The weight of the float 33, the stem 34, and the ribbon 35 is sufficient, when not supported by the fuel in the tank 14, to rotate the shaft 27 against the tension of the spring 36, so as to move the indicator 32 to its zero position. When, however, there is fuel in the tank 14, the float will be raised and the shaft 27 will rotate under the influence of the spring 36, to move the indicator to a position corresponding to the level of the fuel in the tank 14.

The driver, seated in the driver's seat 37, can, by turning his head, see the indicator 32 silhouetted against the rear window 13; or he may make use of the rear-vision mirror 38, to determine the position of the indicator without turning around.

The construction shown in Figures 5, 6 and 7, is similar to that described above, except that in place of the tube 23, the cap 22' carries a housing 23', in which is mounted the shaft 27'. A spiral spring 36' having one end anchored in the housing and its other end secured to the shaft 27', tends to move the indicator to a position indicating that the tank 14 is full. An indicator 32' extending outwardly through a slot 31' in the housing, co-acts with an index scale 40, to indicate the amount of fuel in the tank 14.

For controlling the movement of the shaft 27', the upper end of the ribbon 35 winds around a spool 41, mounted on the shaft 27' and secured thereto. The diameter of the spool 41 is sufficient to accommodate the movement of the float 33.

I prefer to have the end of the indicator 32' extend beyond the end of the index scale 40, so as to be silhouetted against the rear window, as shown in Figure 5.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. The combination with an automobile having a rear window and a rear fuel tank, of means for indicating to the driver of the car the level of fuel in said fuel tank, comprising a threaded rotatable rod extending substantially parallel with one of the horizontal sides of said window, an indicator silhouetted against said window, a threaded connection between said indicator and said rod, a spring tending to rotate said rod in one direction, a float in said fuel tank, and a connection between said float and threaded rod for rotating said rod in the opposite direction as the level in said fuel tank drops.

2. The combination with an automobile having a rear window and a rear fuel tank, of an indicator mounted to move in a horizontal direction along one of the horizontal sides of the window and to register with the window so as to be visible through the window, a float in said tank movable in response to changes of level of fuel in said tank, a threaded rotatable rod engaging with the indicator to move the indicator as the rod is rotated, and means associated with the float and with the rod for rotating the rod as the float moves.

In witness whereof, I hereunto subscribe my name this 8th day of September, 1924.

EARL F. PIERCE.